2,822,357

MANUFACTURE OF POLYETHYLENE OF CONTROLLED MOLECULAR WEIGHT

Donald Lee Brebner, Wilmington, John MacMillan Bruce, Jr., Claymont, and Geiu Stoeff Stamatoff, Newark, Del., assignors to E. I. du Pont de Nemours and Company, Wilmington, Del., a corporation of Delaware No Drawing. Application January 28, 1955
Serial No. 484,812

5 Claims. (Cl. 260—94.9)

This invention relates to methods for controlling molecular weight of polyethylene in processes which yield polyethylene of high density (0.95 to 0.98).

Methods have recently been developed for making substantially unbranched linear polyethylene. The latter material, as has recently been disclosed (cf. British Patent 682,420), is characterized by greater stiffness and higher density than polyethylene heretofore produced commercially. Polyethylene obtained by these newer methods contains less than one methyl side chain per 200 carbon atoms, and in fact usually less than one methyl group per 700 carbon atoms. Among these newer methods, the most attractive are those which are based on initiator systems obtained by admixing a component which is a compound of titanium, molybdenum, zirconium or vanadium, preferably one in which one of the said metals is attached to a group such as —H, -hydrocarbon, -oxyhydrocarbon, -halohydrocarbon, -halide, etc. (or combination of such groups), with a second component having —H, or -hydrocarbon directly attached to metal. Outstanding examples of the first component are $TiCl_4$, $TiCl_3$, $Ti(O\ hydrocarbon)_4$, $Ti(O\ hydrocarbon)_3$. Outstanding examples of the second component are sodium acetylide, products formed by contacting metallic sodium with an alkene higher than ethylene, corresponding products from each of the other alkali metals and alkaline earth metals, alkali metal aluminum hydrides, alkali metal borohydrides, alkaline earth metal hydrides, alkali metal hydrides, aluminum chloroalkyls, metal alkyls, especially aluminum alkyls or alkali metal aluminum alkyls, alkali metal boroalkyls, Grignard reagents, such as phenyl magnesium halides, etc.

One of the troublesome problems which has been encountered in the development of processes based on the hereinabove-mentioned initiator systems is the problem of controlling molecular weight of the product. In the absence of any control, these processes frequently produce polymer of a molecular weight so high, and a melt index so low, as to preclude the use of the polymer in many important practical applications. Some of the methods which have been tried, in controlling the melt index of the product, have involved employing specific elevated temperatures which were dependent upon the ratio of components in the polymerization catalyst, or initiator. These latter methods were quite satisfactory but they required limiting the reaction conditions in a way which placed restrictions on catalyst activity, solubility of the components of the reaction mixture, etc. In order to permit a wider range of operating conditions, it therefore has become desirable to provide new methods for controlling the molecular weight of the polymer.

It has been previously disclosed that the oxygen content of the ethylene monomer in processes such as those hereinabove mentioned (using an inert liquid hydrocarbon medium and an initiator system derived from the components hereinabove set forth) should preferably be kept below 20 parts per million. The maximum oxygen content for appreciable reaction is roughly 500 to 1000 parts per million, depending upon the reaction conditions. Above this critical level of oxygen content, the polymerization rate drops suddenly with further increase in oxygen content. The present invention is concerned with phenomena which occur at oxygen contents well below this critical maximum.

It has also been known heretofore that the above-mentioned methods for polymerizing ethylene are effective at elevated temperatures, i. e. at temperature high enough to produce a solution of the polymeric product, or at relatively low temperatures, i. e. low enough to produce a slurry of polymer which is soluble at elevated temperatures. The present invention is concerned with controlling the molecular weight of polyethylene formed at temperatures sufficiently low to produce a slurry, e. g. temperatures of 20° to 80° C.

It has been discovered that in said processes, at oxygen contents immediately below the critical maximum, the melt index of polyethylene is quite low for many practical applications. More particularly, polymeric product having a melt index of zero is frequently encountered under such conditions. In contrast with this, for most of the practical applications, the melt index should be about 0.01 to 10, preferably 0.01 to 4.0.

It has, however, also been discovered, according to this invention, that the molecular weight of polyethylene, as reflected by the melt index, can be controlled in the said polymerization processes by controlling two factors, namely (1) polymerization time, and (2) oxygen content. At a fixed level of oxygen content the melt index of the product is higher in the initial stages of the polymerization, and gradually decreases as the reaction continues. As an illustration, using $TiCl_4$—$LiAl(alkyl)_4$ catalyst (mol ratio 2:1 to 3.5:1), the polymer produced, in the initial stage of the polymerization, at an oxygen content of 5 p. p. m. had a melt index of about 9, which is slightly higher than the most preferred range. The melt index remained above the most preferred range until about one gram of polymer had formed per millimol of $TiCl_4$. The polymer which was produced after this initial stage was of lower melt index, and the melt index gradually lowered more and more, as reaction time increased. This continued until the weight of polymer formed was about 10 to 15 grams per millimol of $TiCl_4$. At this last stage of the polymerization the polymer formed was of rather high molecular weight, the melt index being generally below 0.1.

In practicing the invention, the polymer can, of course, be removed at any desired stages in the polymerization so as to produce various grades, or molecular weight ranges, chosen to meet market requirements. Moreover, by decreasing the oxygen content as the polymerization proceeds, it is possible to counteract the lowering of the melt index, and produce a polymer of more uniform melt index. Moreover, by fixing the oxygen content at various predetermined initial levels, it is possible to control the range of melt index of the polymer which is formed during the course of the polymerization.

The range of oxygen content within which a desirable range of melt index can be attained initially or during part of the polymerization period is below about 200 parts per million. At 1 to 5 parts per million, the product has a desirable melt index during most of the polymerization period.

In one experiment using $TiCl_4$—$LiAl(heptyl)_4$ (mol ratio 2.5:1), the ethylene containing 50 p. p. m. of oxygen, at 50° C. (cyclohexane diluent, atmospheric pressure), the melt index was 4 during the time when the first gram of polyethylene was formed per millimol of $TiCl_4$. This melt index is excellent from the standpoint of polymer processability. This experiment can be compared with the hereinabove-mentioned experiment wherein ethylene having an oxygen content of 5 p. p. m. initially gave polyethylene having a melt index of 9. Further lowering of the oxygen content raised the melt index of the initial polymer, as described in detail hereinbelow, showing that the molecular weight could be lowered by lowering the oxygen content. On the other hand, raising the oxygen content to 200 p. p. m. resulted in the formation of polymer having, in the initial stages of the polymerization a melt index of virtually zero. The melt index increased to 0.1, for the total product, as the polymerization progressed.

The invention is illustrated further by means of the following examples.

*Example 1.*—Into a glass reaction vessel equipped with a stirrer, reflux condenser, gas inlet means, and means for withdrawal of unreacted gas, was placed 2 liters of cyclohexene, 6.2 millimils $TiCl_4$ and 2.5 millimols of $LiAl(heptyl)_4$. Temperature was maintained at 50° while ethylene containing 5 p. p. m. of oxygen was introduced at atmospheric pressure. A polymer slurry formed. After 18 grams of polymer had formed, 2 grams of the polymer was withdrawn, and the polymerization was continued as before. This initial batch of polyethylene had a melt index of 14. The residual and the next 20 grams of polymer had a melt index of 2; the next 25 grams, a melt index of 0.4; the next 25 grams, a melt index of 0.15; and the next 36 grams, a melt index of 0.05.

*Example 2.*—Example 1 was repeated using ethylene having an oxygen content of 3 p. m. The first 10 grams of the polymer to be formed had a melt index of 14; the residual and next 20 grams a melt index of 8; the next 20 grams a melt index of 4; the next 17 grams a melt index of 1.

In practical operations the polymerization should be continued until the melt index of the polymer has decreased until it is within the desired range, e. g. 0.01 to 4.0, as measured on a withdrawn specimen of the polymer. One of the best methods of carrying out the process of the invention is to collect successive quantities of the polymeric product until at least one of the successive batches has a melt index within the desired range. In this manner any desired molecular weight range (or melt index) can be obtained. In fact, this method lends itself very satisfactorily to the manufacture of polyethylene having a narrowly defined melt index, e. g. a melt index of 1.0, or a melt index of 4.0, etc.

The conditions for carrying out the polymerization reaction can be varied rather widely. In general, the polymerization takes place in an inert organic liquid medium such as xylene, toluene, benzene, hexane, isooctane, decane, decalin, etc., at a pressure which is sufficient to maintain the reaction medium in the liquid phase. The pressure can be as low as atmospheric, or as high as 1000 atmospheres, or even higher. Preferably, however, it is from 1 to 5 atmospheres. Polymerization temperature can be varied widely depending in part on the character of the product which is sought. In general, the process of this invention is most effective when used in conjunction with polymerization reactions carried out at 20° to 60°.

The products obtained in the practice of this invention are highly valuable in the manufacture of films, molding powders, fibers, extruded wire coverings, etc.

What is claimed is the following:

We claim:

1. In the polymerization of ethylene to linear homopolymer having a density of 0.95 to 0.98 in the presence of an inert liquid medium and an initiator system obtained by admixing titanium tetrachloride with a second component having -hydrocarbon attached directly to aluminum, the improvement which comprises introducing into the ethylene polymerization zone a predetermined and controlled amount of oxygen within the range of 1 to 200 parts per million parts by weight of ethylene present, carrying out the polymerization under conditions of temperature and pressure such that polymerized ethylene is produced as a slurried solid phase, said temperature being from 20° C. to 80° C. and said pressure being from 1 to 1000 atmospheres, whereby the melt index of the polymeric product gradually decreases as the polymerization proceeds, continuing the polymerization and the lowering of the melt index of the polymeric product until the polymeric product which is present in the reaction zone has a melt index of from 0.01 to 4.0, and thereupon removing said polymeric product from the reaction zone.

2. Process of claim 1, performed at 20° to 60° C., at a pressure of 1 to 5 atmospheres.

3. Process of claim 2 wherein the components of the initiator are $TiCl_4$ and $LiAl(alkyl)_4$.

4. Process of claim 3 wherein the mol ratio of $TiCl_4:LiAl(alkyl)_4$ is 2:1 to 3.5:1.

5. Process of claim 3 wherein successive quantities of polymeric product are formed in, and removed from, the reaction zone, the process being continued until at least one of the successive batches of polymeric product has a melt index of from 0.01 to 4.

References Cited in the file of this patent

UNITED STATES PATENTS

| | | |
|---|---|---|
| 2,691,647 | Field et al. | Oct. 12, 1954 |
| 2,699,457 | Ziegler | June 11, 1955 |
| 2,728,753 | Russum | Dec. 27, 1955 |